(12) United States Patent
Bemelmans et al.

(10) Patent No.: US 7,724,508 B2
(45) Date of Patent: May 25, 2010

(54) PROTECTIVE COVER FOR FLEXIBLE DISPLAY SCREEN

(75) Inventors: David J. E. Bemelmans, Eindhoven (NL); Ian Buckle, Eindhoven (NL)

(73) Assignee: Polymer Vision Limited, Eindhoven (NL)

( * ) Notice: Subject to any disclaimer, the term of this patent is extended or adjusted under 35 U.S.C. 154(b) by 0 days.

(21) Appl. No.: 11/915,095

(22) PCT Filed: May 17, 2006

(86) PCT No.: PCT/IB2006/051565

§ 371 (c)(1),
(2), (4) Date: Feb. 21, 2008

(87) PCT Pub. No.: WO2006/123297

PCT Pub. Date: Nov. 23, 2006

(65) Prior Publication Data

US 2008/0198540 A1     Aug. 21, 2008

Related U.S. Application Data

(60) Provisional application No. 60/683,044, filed on May 20, 2005.

(51) Int. Cl.
*G06F 1/16* (2006.01)
*G06F 3/02* (2006.01)

(52) U.S. Cl. .................. 361/679.09; 361/679.15; 361/679.26; 361/679.55; 345/169; 345/168

(58) Field of Classification Search .............. 361/681, 361/683; 455/575.1, 575.3, 575.4; 345/168, 345/169, 156, 157
See application file for complete search history.

(56) References Cited

U.S. PATENT DOCUMENTS

| 6,873,315 | B2 * | 3/2005 | Hemia et al. ............... 345/156 |
| 2002/0070910 | A1 | 6/2002 | Fujieda et al. |
| 2003/0103041 | A1 * | 6/2003 | Nguyen et al. ............. 345/168 |
| 2003/0160735 | A1 | 8/2003 | Lee et al. |
| 2005/0041012 | A1 * | 2/2005 | Daniel et al. ............... 345/156 |

FOREIGN PATENT DOCUMENTS

WO    WO 98/19226    5/1998

OTHER PUBLICATIONS

International Search Report for PCT/IB2006/051565 dated Apr. 24, 2007.

* cited by examiner

*Primary Examiner*—Jayprakash N Gandhi
*Assistant Examiner*—Nidhi Desai
(74) *Attorney, Agent, or Firm*—Leydig, Voit & Mayer, Ltd.

(57) ABSTRACT

In a device (10), a flexible display screen (11) and a housing (12, 13) are structurally configurable between an open position and a closed position. The housing (12, 13) visibly exposes a full operating view of the flexible display screen (11) in response to the flexible display screen (11) and the housing (12, 13) being structurally configured in the open position. The housing (12, 13) also visibly exposes a partial operating view of the flexible display screen (11) in response to the flexible display screen (11) and the housing (12, 13) being structurally configured in the closed position. A cover (16) manually or automatically impedes physical damage to the partial operating view of the flexible display screen (11) in response to the flexible display screen (11) and the housing (12, 13) being structurally configured in the closed position.

17 Claims, 5 Drawing Sheets

PROTECTIVE COVER FOR FLEXIBLE DISPLAY SCREEN

FIELD OF THE INVENTION

The present invention generally relates to flexible display screens. The present invention specifically relates to protective covers for flexible display screens.

BACKGROUND

Devices using a flexible display screen (e.g., personal digital assistants, cell phones, etc.) can be designed such that are only two primary configurations. The first primary configuration is a structural configuration of the flexible display screen and the housing in an open position whereby the housing visibly exposes a full operating view of the flexible display screen. The second primary configuration is a structural configuration of the flexible display screen and the housing in a closed position whereby the housing visibly exposes a partial operating view of the flexible display screen. In the closed position, the device may be stored away whereby the partial operating view of the flexible display screen may need to be protected from physical damage (e.g., scratches and folds).

SUMMARY OF THE INVENTION

To this end, the present invention provides a cover that manually or automatically impedes physical damage to the partial operating view of the flexible display screen in response to the flexible display screen and the housing being structurally configured in the closed position.

The foregoing as well as other features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE DRAWINGS

The present invention is premised on devices using a flexible display screen (e.g., personal digital assistants, cell phones, etc.) that are designed to have only two primary configurations. The first primary configuration being a structural configuration of the flexible display screen and the housing in an open position whereby the housing visibly exposes a full operating view of the flexible display screen. The second primary configuration is a structural configuration of the flexible display screen and the housing in a closed position whereby the housing visibly exposes a partial operating view of the flexible display screen.

In practice, the present invention does not impose any limitations or any restrictions as to the primary structural configurations of a device, such as, for example, the present invention does not limit nor restrict the type of movement required of the flexible display screen and/or the housing to switch the device between the open position and the closed position (e.g., lateral or rotational displacement of two units of the housing with a corresponding rolling/unrolling of the flexible display screen, or a rolling/unrolling of the flexible display screen relative to a lateral or rotational displacement of a platform of the housing visibly exposing the operating view of the flexible display screen). Thus, the following description of an exemplary device 10 in accordance with the present invention as illustrated in FIGS. 1-4 does not limit nor restrict the scope of the primary structural configurations of a device in accordance with the present invention.

Referring to FIGS. 1-4, device 10 employs a housing including a drive housing unit 12 and a rolling housing unit 13. A driving end of a flexible display screen ("FSD") 11 extends with a slot of drive housing unit 12 to thereby be in electrical communication with a drive electronics ("DE") 14 disposed within drive housing unit 12. A rolling end of flexible display screen 12 extends with a slot of rolling housing unit 13 to thereby be rotatably coupled to a retractable rolling mechanism ("RM") 15 disposed within rolling housing unit 13.

Figure 1:
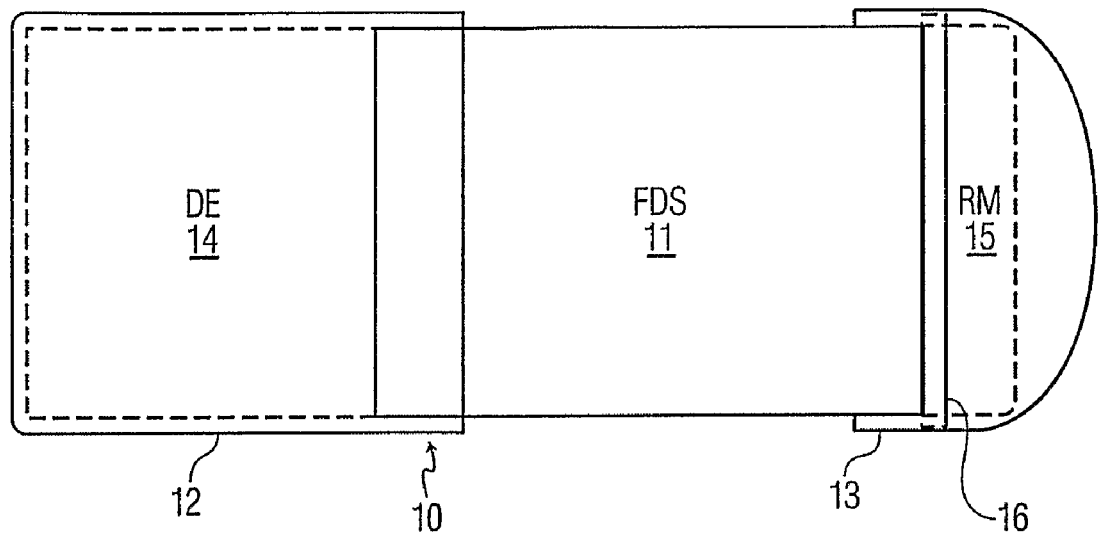
FIGS. 1 and 2 illustrate a top view and a side view, respectively, of a block diagram of an open position of a device in accordance with a first embodiment of the present invention.
Figure 2:
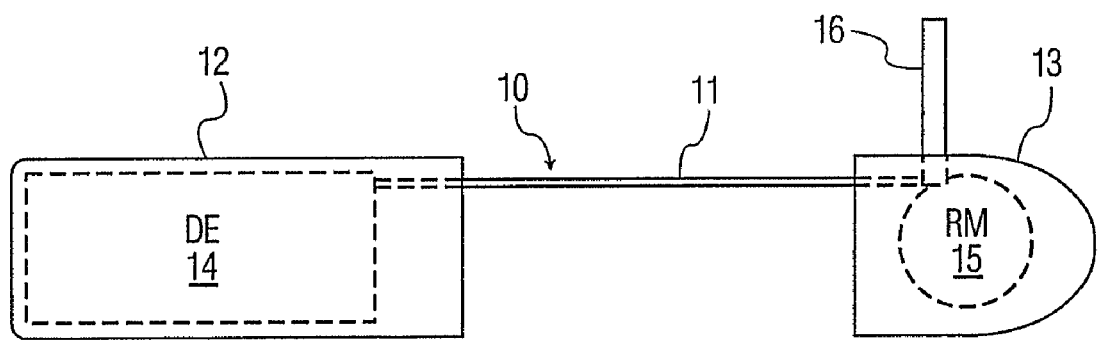
Figure 3:
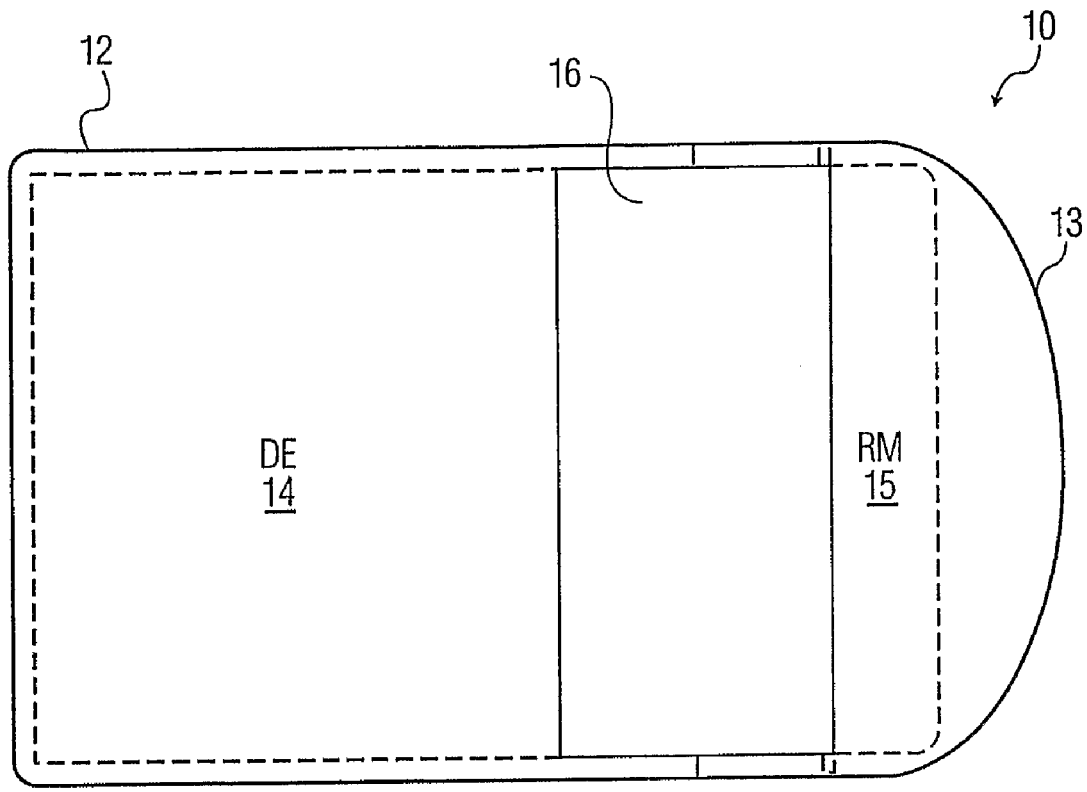
FIGS. 3 and 4 illustrate a top view and a side view, respectively, of a block diagram of an open position of a device in accordance with the first embodiment of the present invention.
Figure 4:
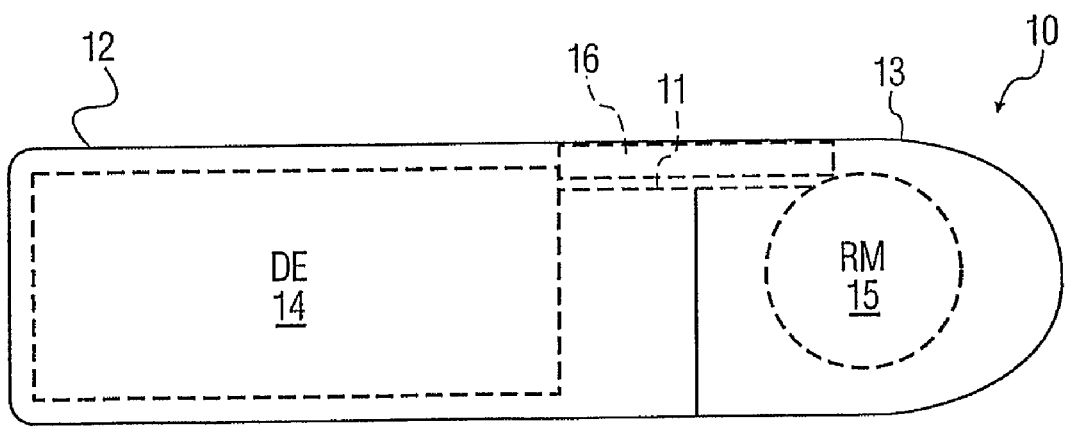

To structurally configure flexible display screen 11 and the housing in an open position as shown in FIGS. 1 and 2, a user of the device holds and pulls housing units 12 and 13 away from each other to thereby unroll the flexible display screen 11 from rolling mechanism 15 whereby a full operating view of flexible display screen 11 is visibly exposed to a user or users of the device. Conversely, to structurally configure flexible display screen 11 and the housing in a closed position as shown in FIGS. 3 and 4, a user of the device holds and retracts housing units 12 and 13 toward each other to thereby roll flexible display screen 11 within rolling mechanism 15 whereby a partial operating view of flexible display screen 11 is visibly exposed to a user or users of the device.

A transparent cover 16 is provided to impede physical damage to the partial view of flexible display screen. Cover 16 vertically extends from rolling housing unit when flexible display screen 11 and the housing are structurally configured in the open position as best shown in FIG. 2. Cover 16 horizontally extends from rolling housing unit when flexible display screen 11 and the housing are structurally configured in the closed position as best shown in FIG. 4.

In a manual embodiment, cover 16 is rotatably coupled to rolling housing unit 13 to facilitate a manual rotation of cover 16 to and from flexible display screen 11.

In one automatic embodiment, cover 16 is operably coupled to the relative movement between housing units 12 and 13 whereby cover 16 rotates toward flexible display screen 11 as housing units 12 and 13 are being retracted toward each other, and cover 16 rotates away from flexible display screen 11 as housing units 12 and 13 are being pulled away from each other.

Figure 5:
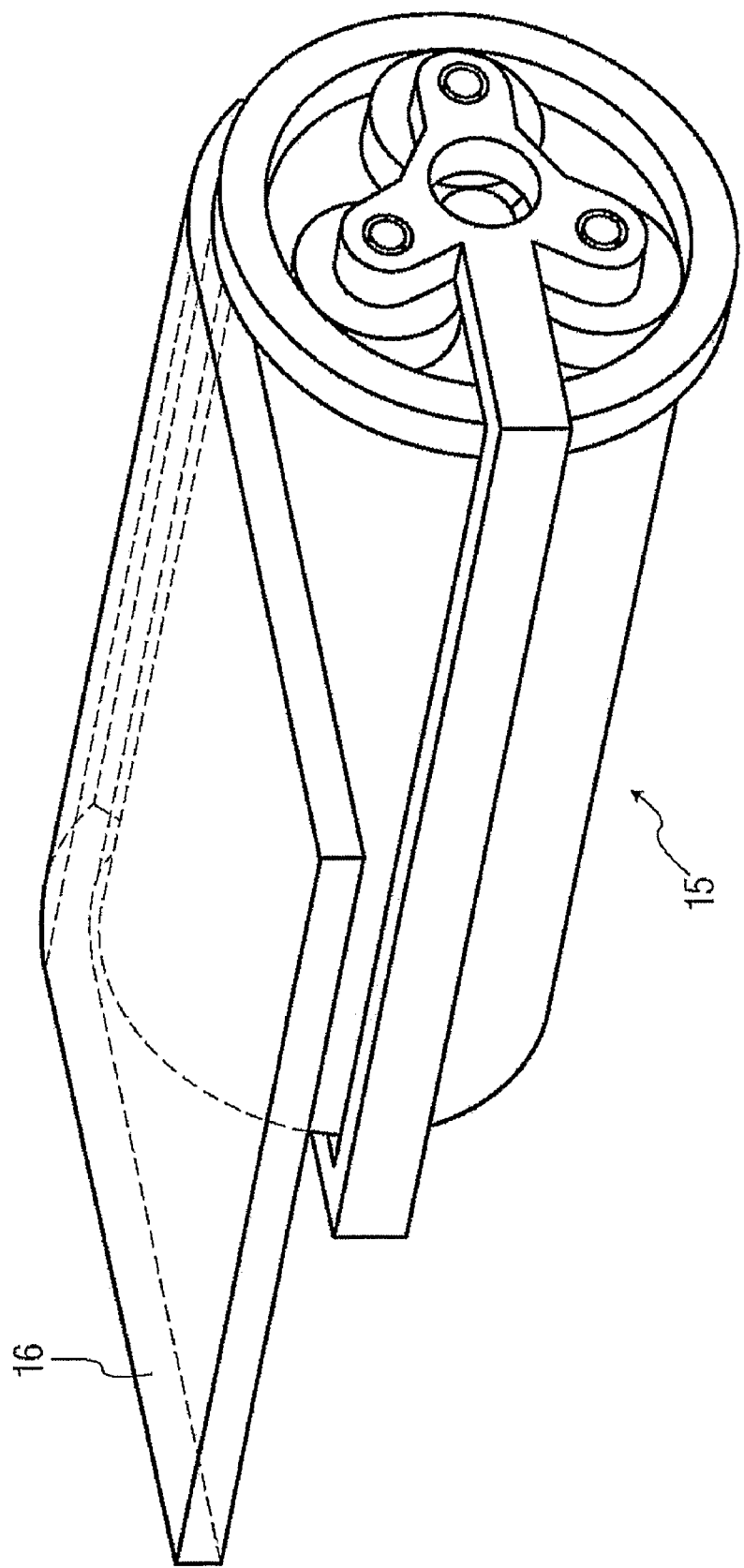
FIG. 5 illustrates a perspective top view of a coupling of a cover to a rolling mechanism in accordance with a second embodiment of the present invention.

In a second automatic embodiment, cover 16 is operable coupled to rolling mechanism 15 as best shown in FIG. 5 whereby cover 16 rotates toward flexible display screen 11 as flexible display screen 11 is being rolled around rolling mechanism 15, and cover 16 rotates away from flexible display screen 11 as flexible display screen 11 is being unrolled from around rolling mechanism 15.

Figure 6:
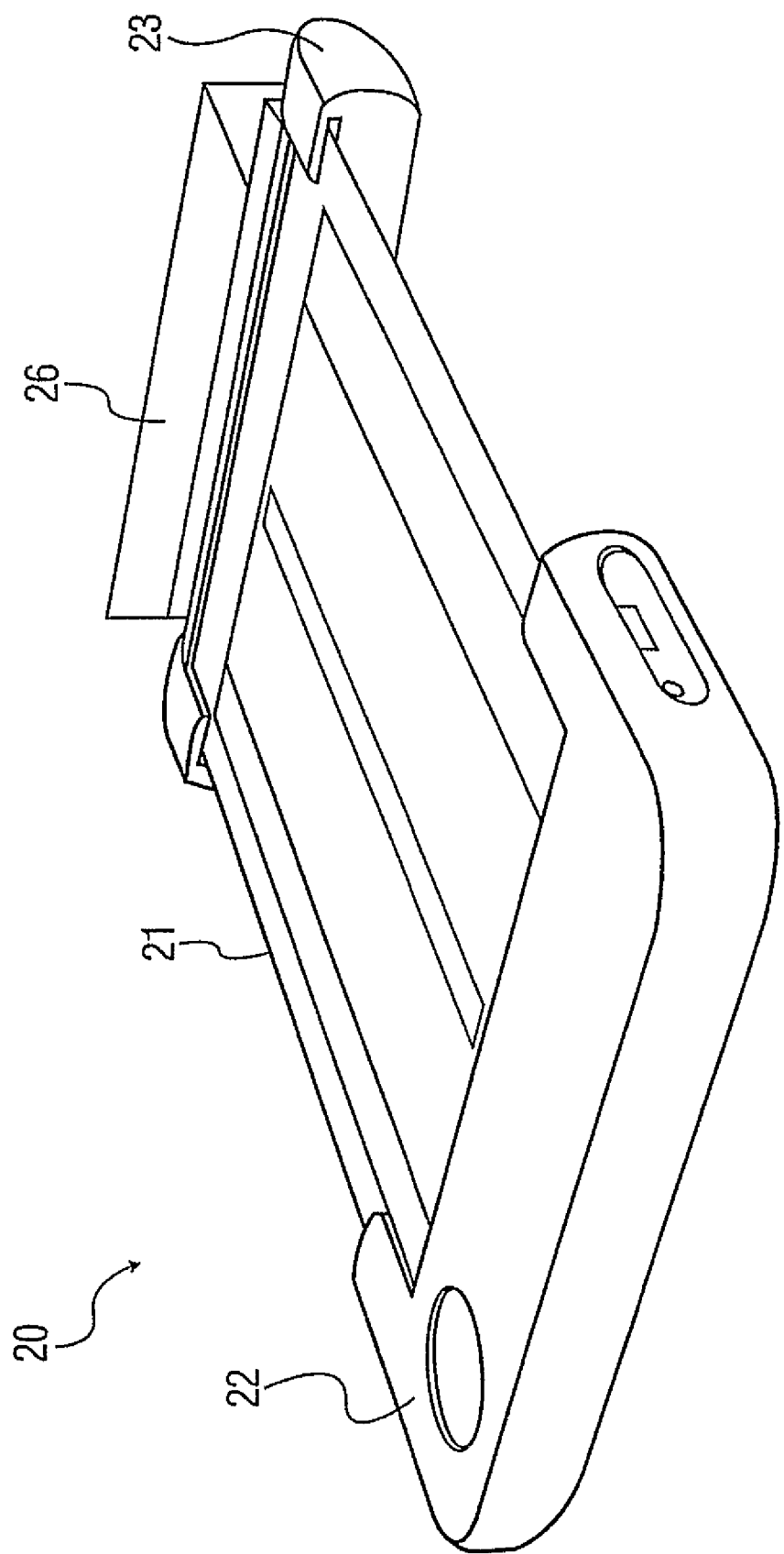
FIGS. 6 and 7 illustrate an exemplary perspective top view of a commercial implementation of the device illustrated in FIGS. 1-4 in an open position and a closed position, respectively.
Figure 7:
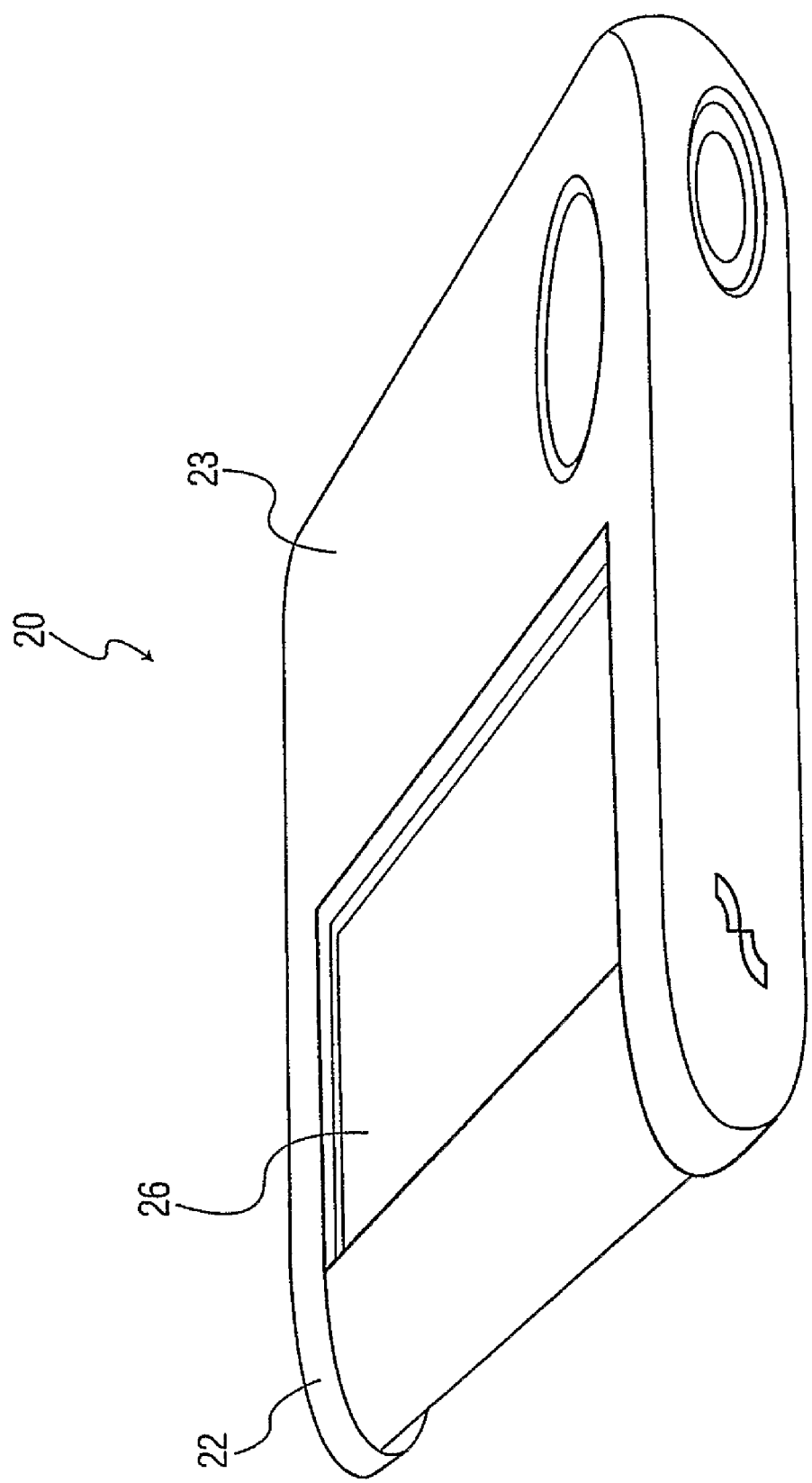

To facilitate a clearer understanding of device 10, a commercial implementation 20 of device 10 is illustrated in FIGS. 6 and 7. In particular, FIG. 6 shows device 20 having a flexible display screen 21 and a housing including a driving housing unit 22 and a rolling housing unit 23 structurally configured in an open position whereby a full operating view of flexible display screen 21 is visibly exposed. Conversely, FIG. 7 shows device 20 having flexible display screen 21 and housing units 22 and 23 structurally configured in a closed position whereby a partial operating view of flexible display screen 21 is visibly exposed through a transparent cover 26.

Embodiments of the present invention have been described above by way of example only, and it will be apparent to a person skilled in the art that modifications and variations can be made to the described embodiments without departing from the scope of the invention as defined by the appended claims. Further, in the claims, any reference signs placed between parentheses shall not be construed as limiting the claim. The term "comprising" does not exclude the presence of elements or steps other than those listed in a claim. The terms "a" or "an" does not exclude a plurality. The invention can be implemented by means of hardware comprising several distinct elements, and by means of a suitably programmed computer. In a device claim enumerating several means, several of these means can be embodied by one and the same item of hardware. The mere fact that measures are recited in mutually different independent claims does not indicate that a combination of these measures cannot be used to advantage.

The invention claimed is:

1. A device, comprising:
 a flexible display screen and a housing structurally configurable between an open position and a closed position,
 wherein the housing is operable to visibly expose a full operating view of the flexible display screen in response to the flexible display screen and the housing being structurally configured in the open position, and
 wherein the housing is operable to visibly expose a partial operating view of the flexible display screen in response to the flexible display screen and the housing being structurally configured in the closed position;
 a rolling mechanism operable to unroll the flexible display screen from within the housing in response to a structural reconfiguration of the flexible display screen and the housing from the closed position to the open position; and
 a cover operable to impede physical damage to the partial operating view of the flexible display screen in response to the flexible display screen and the housing being structurally configured in the closed position;
 wherein the rolling mechanism is operable concurrently roll the flexible display screen within the housing and rotate the cover toward the flexible display screen in response to a structural reconfiguration of the flexible display screen and the housing from the open position to the closed position.

2. The device of claim 1, where the cover is operable to impede physical damage to a portion of the full operating view of the flexible display screen in response to the flexible display screen and the housing being structurally configured in the open position.

3. The device of claim 1, wherein the cover is transparent.

4. The device of claim 1, wherein the cover is rotatable relative to the housing.

5. The device of claim 1, wherein the rolling mechanism is operable to concurrently unroll the flexible display screen from within the housing and rotate the cover away from the flexible display screen in response to the structural reconfiguration of the flexible display screen and the housing from the closed position to the open position.

6. The device of claim 5,
 wherein the housing includes a drive housing unit and a rolling housing unit operatively coupled to opposing ends of the flexible display screen; and
 wherein the drive housing unit and the rolling housing unit are operable to switch the flexible display screen and the housing between the open position and the closed position.

7. The device of claim 6,
 wherein the drive housing unit accommodates drive electronics operable to drive the flexible display screen; and
 wherein the rolling housing unit accommodates a rolling mechanism operable to unroll the flexible display screen from the closed position to the open position and roll the flexible display screen from the open position to the closed position.

8. A device, comprising:
 a flexible display screen and a housing structurally configurable between an open position and a closed position,
 wherein the housing is operable to visibly expose a full operating view of the flexible display screen in response to the flexible display screen and the housing being structurally configured in the open position, and
 wherein the housing is operable to visibly expose a partial operating view of the flexible display screen in response to the flexible display screen and the housing being structurally configured in the closed position;
 a cover operable to impede physical damage to the partial operating view of the flexible display screen in response to the flexible display screen and the housing being structurally configured in the closed position; and a rolling mechanism,
 wherein the rolling mechanism is operable to rotate the cover toward the flexible display screen in response to a structural reconfiguration of the flexible display screen and the housing from the open position to the closed position, and
 wherein the rolling mechanism is further operable to rotate the cover away from the flexible display screen in response to a structural reconfiguration of the flexible display screen and the housing from the closed position to the open position.

9. The device of claim 8, where the cover is operable to impede physical damage to a portion of the full operating view of the flexible display screen in response to the flexible display screen and the housing being structurally configured in the open position.

10. The device of claim 8, wherein the cover is transparent.

11. The device of claim 8, wherein the cover is rotatable relative to the housing.

12. The device of claim 8,
 wherein the rolling mechanism is further operable to roll the flexible display screen within the housing in response to the structural reconfiguration of the flexible display screen and the housing from the open position to the closed position; and
 wherein the rolling mechanism is further operable to unroll the flexible display screen from within the housing in response to the structural reconfiguration of the flexible display screen and the housing from the closed position to the open position.

13. The device of claim 8, wherein the housing includes a drive housing unit and a rolling housing unit operatively coupled to opposing ends of the flexible display screen; and wherein the drive housing unit and the rolling housing unit are operable to switch the flexible display screen and the housing between the open position and the closed position.

14. The device of claim 13, wherein the drive housing unit accommodates a drive electronics operable to drive the flexible display screen; and wherein the rolling housing unit accommodates the rolling mechanism.

15. A device, comprising:

a flexible display screen and a housing structurally configurable between an open position and a closed position, wherein the housing is operable to visibly expose a full operating view of the flexible display screen in response to the flexible display screen and the housing being structurally configured in the open position, and wherein the housing is operable to visibly expose a partial operating view of the flexible display screen in response to the flexible display screen and the housing being structurally configured in the closed position;

a rolling mechanism operable to unroll the flexible display screen from within the housing in response to a structural reconfiguration of the flexible display screen and the housing from the closed position to the open position; and a cover operable to impede physical damage to the partial operating view of the flexible display screen in response to the flexible display screen and the housing being structurally configured in the closed position wherein the rolling mechanism is operable to concurrently unroll the flexible display screen from within the housing and rotate the cover away from the flexible display screen in response to the structural reconfiguration of the flexible display screen and the housing from the closed position to the open position.

16. The device of claim 15, wherein the housing includes a drive housing unit and a rolling housing unit operatively coupled to opposing ends of the flexible display screen; and wherein the drive housing unit and the rolling housing unit are operable to switch the flexible display screen and the housing between the open position and the closed position.

17. The device of claim 16, wherein the drive housing unit accommodates drive electronics operable to drive the flexible display screen; and wherein the rolling housing unit accommodates a rolling mechanism operable to unroll the flexible display screen from the closed position to the open position and roll the flexible display screen from the open position to the closed position.

* * * * *